United States Patent
Lilley et al.

(10) Patent No.: US 6,447,027 B1
(45) Date of Patent: Sep. 10, 2002

(54) QUICK CONNECT HYDRANT NOZZLE FOR CONNECTING A FIRE HOSE TO A FIRE HYDRANT

(75) Inventors: Ted. A. Lilley, White Lake; Kevin Danielson, Union Lake, both of MI (US)

(73) Assignee: RLS Group, White Lake, MI (US)

( * ) Notice: Subject to any disclaimer, the term of this patent is extended or adjusted under 35 U.S.C. 154(b) by 0 days.

(21) Appl. No.: 09/659,172

(22) Filed: Sep. 11, 2000

Related U.S. Application Data

(60) Provisional application No. 60/153,177, filed on Sep. 10, 1999.

(51) Int. Cl.[7] .............................................. F16L 19/00
(52) U.S. Cl. ...................... 285/360; 285/376; 285/401; 285/148.19; 285/148.2
(58) Field of Search ................................. 285/360, 361, 285/362, 376, 377, 396, 401, 402, 391, 148.19, 148.21, 148.2

(56) References Cited

U.S. PATENT DOCUMENTS

| | | | |
|---|---|---|---|
| 3,596,936 A | * | 8/1971 | Dieckmann et al. ........ 285/396 |
| 4,402,531 A | | 9/1983 | Kennedy, Jr. |
| 4,602,654 A | | 7/1986 | Stehling et al. |
| 5,072,750 A | * | 12/1991 | Poms et al. .................. 137/296 |
| 5,333,915 A | * | 8/1994 | Sparling et al. ............... 285/69 |
| 6,102,444 A | * | 8/2000 | Kozey ......................... 285/376 |
| 6,102,450 A | * | 8/2000 | Harcourt ...................... 285/401 |

* cited by examiner

*Primary Examiner*—Lynne H. Browne
*Assistant Examiner*—Aaron Dunwoody
(74) *Attorney, Agent, or Firm*—Clark Hill PLC

(57) ABSTRACT

A hydrant nozzle for connecting a fire hose to a fire hydrant. The hydrant nozzle comprises a tubular body portion extending longitudinally between a first end and a second end. The body portion has a generally cylindrical outer surface and a generally cylindrical inner surface defining a fluid passageway between the first and second ends. The nozzle further includes a cylindrical neck portion extending from the second end of the body portion to a front face and having an outer peripheral rim and an inner rim defining a center opening in fluid communication with the fluid passageway of the body portion. A pair of spaced apart locking lugs project outwardly from the outer surface and are positioned between the first and second ends of the body portion for removably securing the hydrant nozzle to the fire hydrant. A pair of spaced apart arcuate shaped locking grooves are recessed in the front face of the neck portion between the inner and outer rims for removably securing the hydrant nozzle to the fire hose.

11 Claims, 4 Drawing Sheets

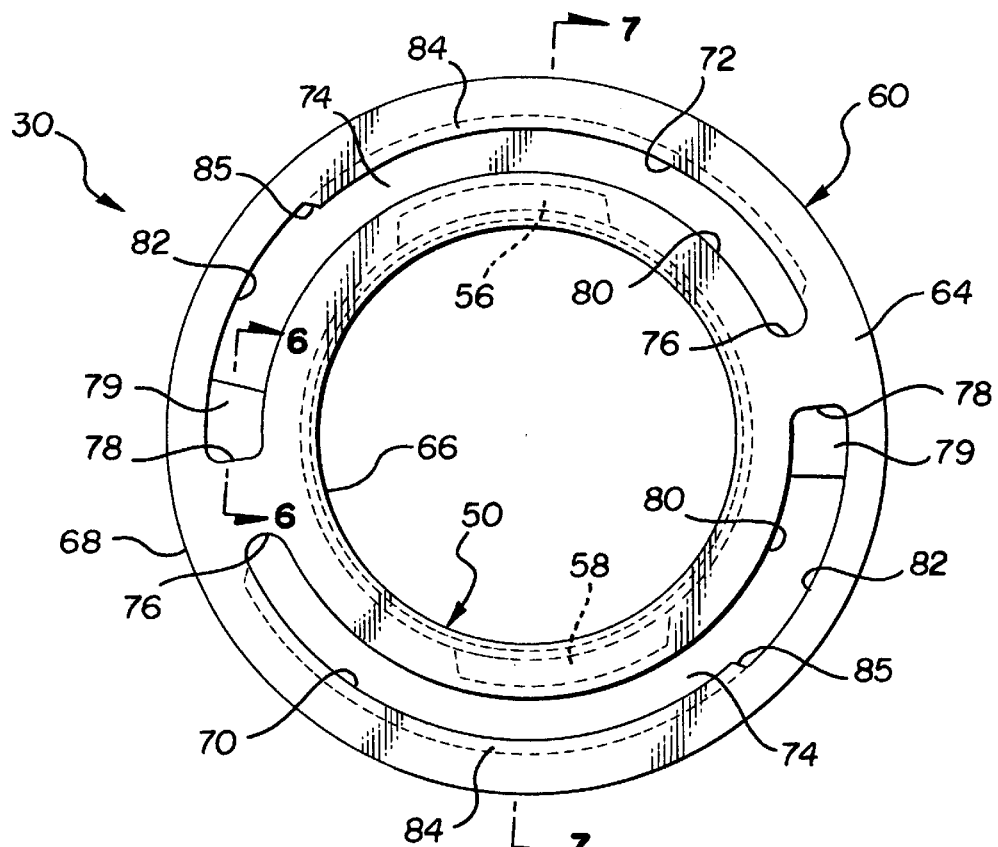
FIG-5
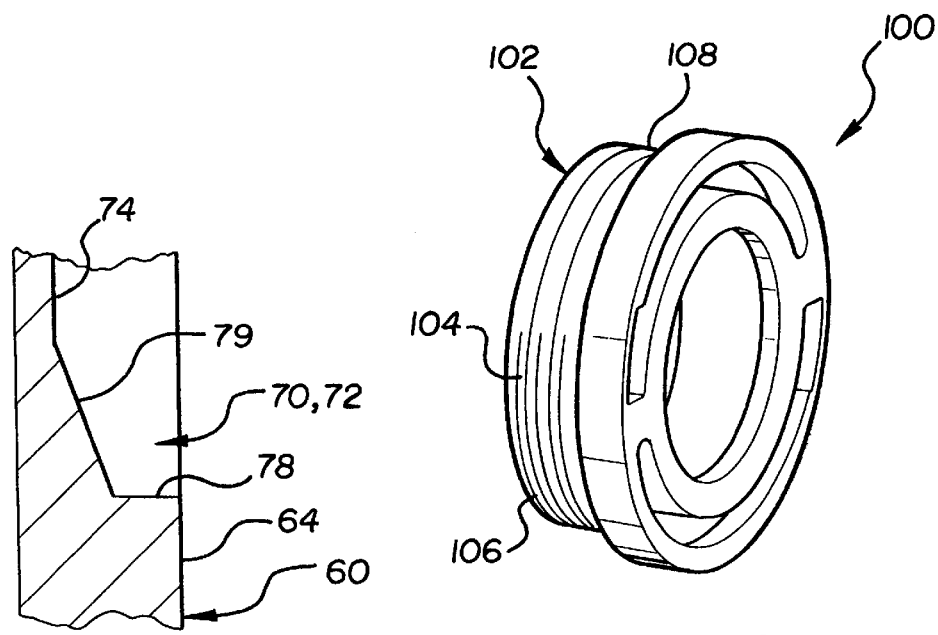
FIG-6
FIG-9

QUICK CONNECT HYDRANT NOZZLE FOR CONNECTING A FIRE HOSE TO A FIRE HYDRANT

RELATED APPLICATION

This application claims the benefit under 35 USC Section 119(e) of United States provisional application Ser. No. 60/153,177, filed on Sep. 10, 1999.

BACKGROUND OF THE INVENTION

1. Field of Invention

The subject invention relates to a quick connect hydrant nozzle for connecting a fire hose to a fire hydrant.

2. Background of Invention

Generally, fire hoses are connected to a fire hydrant by way of a hydrant nozzle and/or adapter. A fire hydrant typically includes one or more fluid ports, i.e. water outlets, adapted to receive an end of a fire hose and supply pressurized water thereto. The water outlets typically include either an internal threaded portion or a locking groove for receiving the end of the fire hose or a hydrant nozzle. A hydrant nozzle is most frequently connected to the water outlet for connection to the fire hose. A traditional hydrant nozzle typically includes a first end having a pair of locking lugs which mating engage the locking groove of the water outlet to secure the nozzle to the hydrant. The nozzle also traditionally includes a opposite male threaded end which attaches to a mating threaded female end on the fire hose. Of course, attaching the fire hose in this fashion is cumbersome and requires a significant amount of time to thread the fire hose to the fire hydrant.

Other fire hydrants utilize an adaptor or connection system referred to by those of ordinary skill in the art as a Storz coupling. First, a hydrant nozzle is connected to the water outlet of the hydrant. The water port may include internal female threads or recessed locking grooves for receiving the nozzle. The nozzle typically includes a first end having a pair of external locking lugs that cooperate with the locking grooves in the water outlet to hold the nozzle in place upon rotation of the hydrant nozzle. In some cases, the hydrant nozzle may include external male threads which thread directly into the internal female threads of the outlet rather than the aforementioned locking lugs and grooves. The nozzle also includes a second end having external threads projecting outwardly from the water outlet. The Storz coupling includes an adapter having a first end with internal female threads for mating threaded engagement with the second threaded end of the nozzle. The adapter further includes a second end having a pair of locking lugs and locking grooves for receiving and securing the end of the fire hose to the fire hydrant. However, most fire hydrants do not have the adapter, or Storz coupling, attached to them, and therefore, fire departments must carry the adapter with them and then thread it onto the hydrant nozzle for connection with the fire hose. This certainly defeats the effort of a quick connection between a fire hose and fire hydrant in an emergency fire situation.

Therefore, it remains desirable to provide a quick connect hydrant nozzle secured within the port of the fire hydrant for readily receiving and connecting a fire hose to the fire hydrant.

SUMMARY OF THE INVENTION

The present invention includes a hydrant nozzle for connecting a fire hose to a fire hydrant. The hydrant nozzle comprises a tubular body portion extending longitudinally between a first end and a second end. The body portion has a generally cylindrical outer surface and a generally cylindrical inner surface defining a fluid passageway between the first and second ends. The nozzle further includes a cylindrical neck portion extending from the second end of the body portion to a front face and having an outer peripheral rim and an inner rim defining a center opening in fluid communication with the fluid passageway of the body portion. A pair of spaced apart locking lugs project outwardly from the outer surface and are positioned between the first and second ends of the body portion for removably securing the hydrant nozzle to the fire hydrant. A pair of spaced apart arcuate shaped locking grooves are recessed in the front face of the neck portion for removably securing the hydrant nozzle to the fire hose.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a front view of the hydrant nozzle of FIGS. 3 and 4;

FIG. 6 is a cross-sectional view taken along line 6—6 of FIG. 5;

FIG. 9 is a perspective view of an alternative hydrant nozzle according to the subject invention.

DETAILED DESCRIPTION OF THE PREFERRED EMBODIMENT

Figure 1:
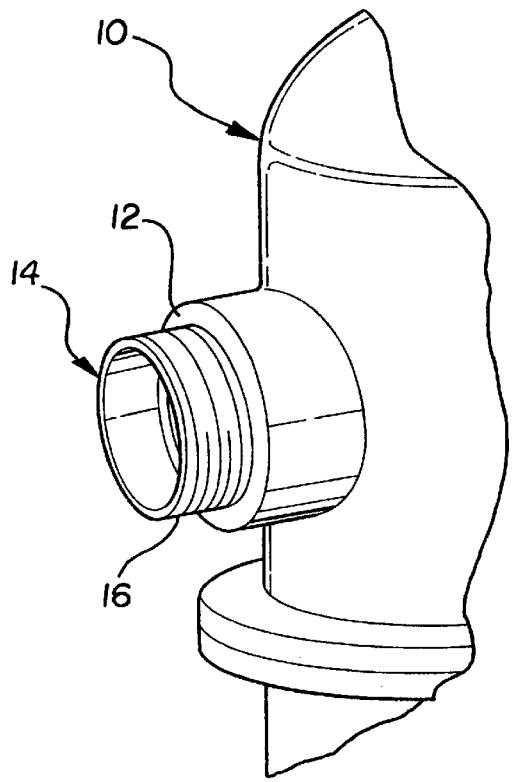
FIG. 1 a partially broken perspective view of a fire hydrant having a prior art hydrant nozzle secured to a water port of the hydrant.

Referring to the prior art FIG. 1, a fire hydrant as commonly known to one of ordinary skill in the art is generally shown at 10. The fire hydrant 10 includes a fluid port, or water outlet, 12 for supplying pressurized water to a fire hose (not shown). A traditional prior art hydrant nozzle 14 is shown connected to the water outlet 12. The nozzle 14 includes a distal end projecting from the outlet 12 and having a plurality of external, or male, threads 16. The nozzle 14 is traditionally permanently installed to the hydrant 10 and covered by a threaded cap when not in use. In order to connect a fire hose to the nozzle 14, and thus the hydrant 10, the fire hose must include a female threaded end connector to mating engaging and attach to the threads 16 on the end of the nozzle 14. Alternatively, an adapter must be connected between the nozzle 14 and the end of the fire hose for completely the connection therebetween.

Figure 2:
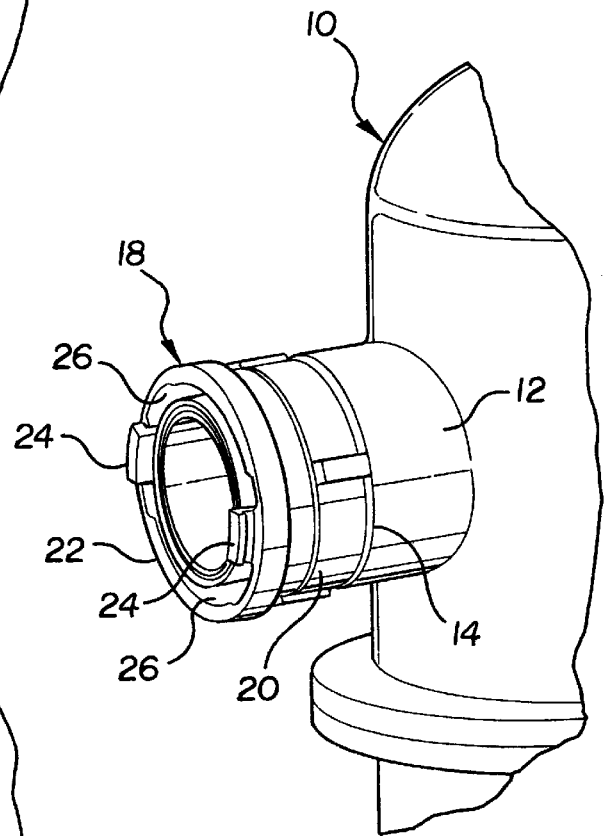
FIG. 2 is a partially broken perspective view of a fire hydrant having a prior art Storz coupling connected to the hydrant nozzle of the hydrant.

For example, referring to prior art FIG. 2, the hydrant 10 is shown with a Storz type adapter 18 secured to the nozzle 14 for receiving and connecting a fire hose. The Storz adapter 18 includes an internally threaded first end 20 which is threaded onto the externally threaded end of the nozzle 14. The adapter 18 further includes an opposite second end commonly referred to as a Storz coupler 22 for connecting the end of a fire hose to the hydrant 10. The Storz coupler 22 includes a pair of bayonet type locking lugs 24 spaced apart by a pair of recessed locking grooves 26 for cooperating with a Storz type coupler having mating locking lugs and grooves on the end of a traditional fire hose. Therefore, fire fighters having Storz type coupler fire hoses must first attach the adapter 18 to the nozzle 14 in order to connect the fire hose to the hydrant 10.

Figure 3:
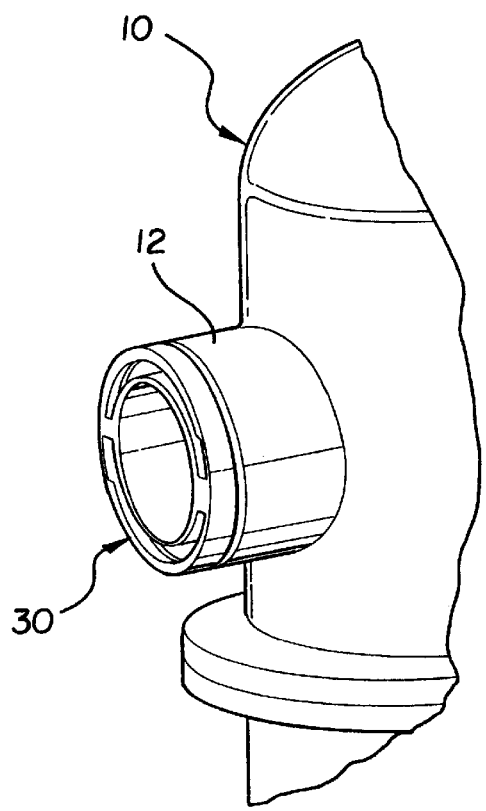
FIG. 3 is a partially broken perspective view of a quick connect hydrant nozzle connected to a fire hydrant according to the preferred embodiment of the subject invention.

Referring to FIG. 3, the preferred embodiment of the subject invention is illustrated showing a quick connect hydrant nozzle 30 connected to the water outlet 12 of the hydrant 10. The subject invention hydrant nozzle 30 is connected to the outlet 12 and in essence becomes an integral part of the hydrant 10, making the hydrant 10 compatible with Storz type coupler fire hoses. In otherwords, the prior art hydrant nozzle 14 of FIG. 1 is removed from the hydrant 10 and replaced by the subject invention hydrant nozzle 30. Therefore, the fire hose may be connected directly to the hydrant nozzle 30, without the need for the adaptor 18, thus reducing the connection time between the fire hose and hydrant 10.

More specifically, referring to FIGS. 4–8, the quick connect hydrant nozzle 30 is shown for connecting a fire hose 32 to a fire hydrant 34. The fire hose 32 is of the type commonly known to one of ordinary skill in the art and includes a flexible hose section 36 and a Storz type end coupler 38. The Storz type end coupler 38 includes a pair of bayonet type L-shaped locking lugs 40, 41 projecting from the end of the hose 32 and spaced apart by approximately 180 degrees. The fire hydrant 34 is also of the type commonly known to one of ordinary skill in the art and includes a tubular body section 42 and at least one fluid port, or water outlet 44. The water outlet 44 is generally cylindrical in shape and includes a spiral inner groove 46. The hydrant nozzle 30 is seated between and interconnects the end coupler 38 of the fire hose 32 to the water outlet 44 of the fire hydrant 34. The nozzle 30 is constructed of a one-piece lead-free brass alloy The hydrant nozzle 30 includes a hollow tubular body portion 50 extending along a longitudinal axis defined between a first distal and tapered end 52 adapted to be received in the water outlet 44 and a second end 54 defining a fluid passageway 55 therebetween. The tubular body portion 50 includes a pair of spaced apart locking lugs 56, 58 extending outwardly from the body portion 50 and positioned between the first and second ends 52, 54. More specifically, the locking lugs 56, 58 are generally rectangular blocks positioned transverse to the longitudinal axis of the body portion 50 and arranged at a predetermined angle (spiral or arc-shaped configuration) relative to the ends 52, 54 and corresponding to the angle of the spiral inner groove 46 of the water outlet 44. The lugs 56 are also spaced apart by approximately 180 degrees about the circumference of the body portion 50.

The hydrant nozzle 30 further includes a cylindrical neck portion 60 extending radially outwardly from the second end 54 of the body portion 50 and having a center opening 62 in fluid communication with the fluid passageway 55 of the body portion 50. In the preferred embodiment, the diameter of the neck portion 60 is greater than the diameter of the body portion 50, however, each diameter may vary to accommodate various size water outlets 46 and fire hose couplers 38. The neck portion 60 includes a flat front face 64 extending from an inner rim 66 defining the center opening 62 and an outer rim 68 forming the outermost periphery of the neck portion 60. A pair of spaced apart, elongated and arcuate shaped locking grooves 70, 72 are formed in the front face 64 of the neck portion 60 and are adapted to receive and connect the corresponding locking lugs 40, 42 of the fire hose 32 thereto. Each locking groove 70, 72 extends along an arcuate path between a first end wall 76 and a second opposite end wall 78.

Figure 8:
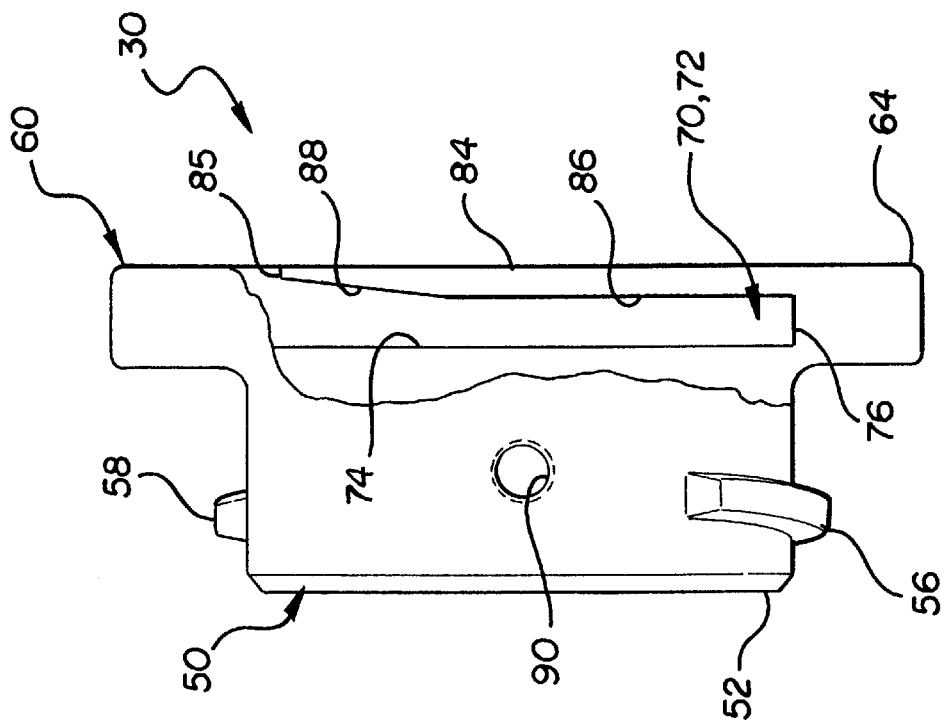
FIG. 8 is a partially broken away side view of the hydrant nozzle.
Figure 7:
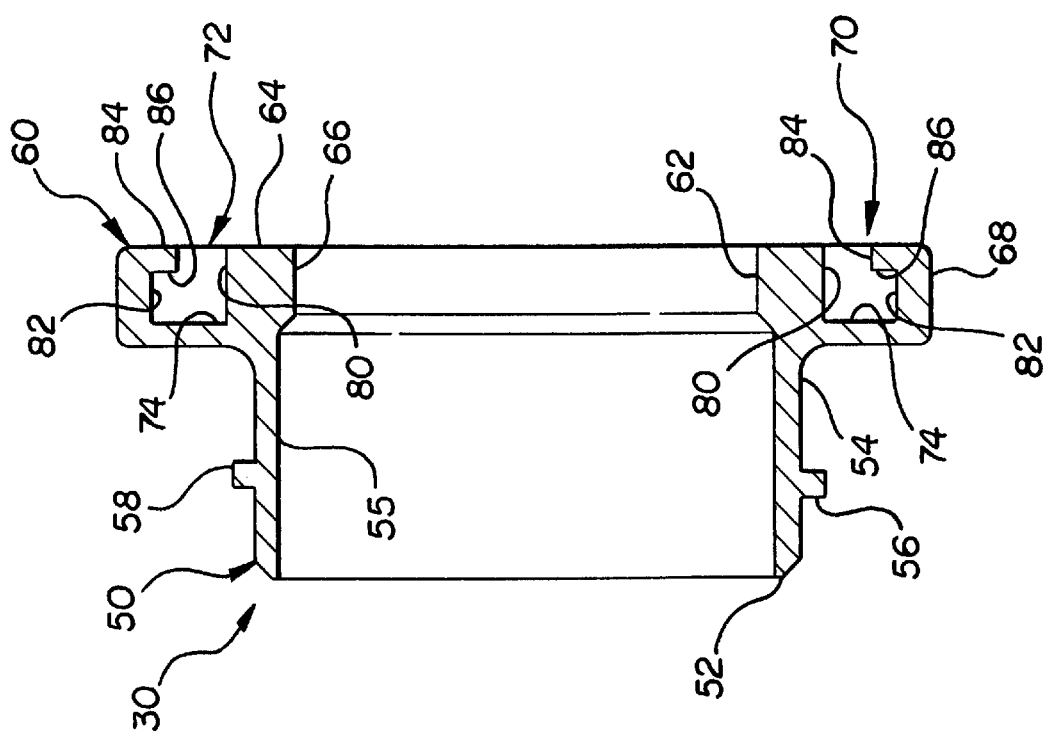
FIG. 7 is a cross-sectional view taken along line 7—7 of FIG. 5.

More specifically, referring to FIGS. 5–8, each locking groove 70, 72 includes a bottom surface 74 recessed from the front face 64 and extending between the first and second end walls 76, 78. The bottom surface 74 includes an inclined, or ramped, section 79 adjacent the second ends 78 inclining toward the front face 64 as best shown in FIGS. 5 and 6. Each groove 70, 72 further includes upstanding, parallel and curved inner and outer walls 80, 82 projecting upwardly from the bottom surface 74 to the front face 64 and extending between the first and second end walls 76, 78. The front face 62 further includes a lip, or overhanging shelf, 84 projecting radially inwardly from a portion of the outer wall 82 toward the inner wall 80 forming a top surface 86 of the grooves 70, 72 spaced from and parallel to the bottom surface 74 and defining an L-shaped cross-section as shown in FIG. 7. The lip 84 extends from the first end wall 76 and terminates in an end 85 spaced from the second end wall 78. The top surface 86 formed by the lip 84 includes a inclined, or ramped section 88 extending from the end 85 toward the first end wall 76 as shown in FIG. 8. Finally, the nozzle 30 includes a locking screw 90 threaded into the body portion 50 for locking the nozzle 30 to the hydrant 34 as will be discussed below.

In operation, referring again to FIG. 4, the quick connect hydrant nozzle 30 is arranged such that the distal end 52 of the body section 50 is aligned to be received within the water outlet 44 of the hydrant 34. The nozzle 30 is axially inserted into the opening formed by the water outlet 44 until the locking lugs 56, 58 are received in the inner groove 46. The nozzle 30 is then rotated in the clockwise direction within the outlet 44 until the tapered distal end 52 of the body portion 50 is seated against a seal within the outlet 44 and the neck portion 60 is against or adjacent to the opening of the outlet 44 to create a fluid tight connection between the nozzle 30 and the hydrant 34. The locking screw 90 may then be threaded into the outlet 44 to fixedly secure the nozzle 30 to the hydrant 34. The nozzle 30 is typically permanently installed in the outlet 44 of the fire hydrant 34 as shown in FIG. 3 in replacement of the prior art hydrant nozzle 14.

During use, the fire hose 32 may be directly connected to the fire hydrant 34 via the quick connect hydrant nozzle 30. Specifically, L-shaped locking lugs 40, 41 on the coupler 38 of the fire hose 32 are received in the corresponding locking grooves 70, 72 of the nozzle 30. Each locking lug 40, 41 is inserted into the corresponding groove 70, 72 between the second end wall 78 and the end 85 of the lip 84. The coupler portion 38 may then be rotated in the clockwise direction forcing the locking lugs 40, 41 toward the first end wall 76. The locking lugs 40, 41 each include outwardly projecting lip 43 which engages the inclined section 88 of the top surface 86 formed by the lip 84 and forces the locking lugs 40, 41 into frictional locking engagement with the top surface 86. The coupler 38 typically includes a sealing gasket which engages the front face 64 of the neck portion 60 to create a fluid tight seal between the nozzle 30 and the hose 32. To disconnect the hose 32 from the nozzle 30, and thus, the hydrant 34, the coupler 38 is rotated in the counterclockwise direction moving the locking lugs 40, 41 toward the second end wall 78 of the locking grooves 70, 72 and past the lip 84. The inclined section 79 on the bottom surface 74 engages with the locking lugs 40, 41 forcing the coupler end 38 of the hose 32 axially out of the locking grooves 70, 72 and assist in releases the fluid tight seal between the nozzle 30 and the hose 32.

Referring to FIG. 9, an alternative embodiment of the hydrant nozzle is shown at 100. The alternative nozzle 100 varies from the preferred embodiment by including a body portion 102 having a plurality of external threads 104 extending between the distal end 106 and the second end 108. If the water outlet 44 of the fire hydrant 34 includes internal threads as opposed to the locking groove 46, the external threads 104 of the nozzle 100 may simply be threaded into engagement with the threads of the outlet 44 to connect the nozzle 100 to the hydrant 34.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practised other than as specifically described.

What is claimed is:

1. A hydrant nozzle for connecting a fire hose to a fire hydrant, said hydrant nozzle comprising:

a tubular body portion extending longitudinally between a first end and a second end, said body portion having a generally cylindrical outer surface and a generally cylindrical inner surface defining a fluid passageway between said first and second ends;

a cylindrical neck portion extending from said second end of the body portion to a front face and having an outer peripheral rim and an inner rim defining a center opening in fluid communication with said fluid passageway of said body portion;

a pair of spaced apart locking lugs projecting outwardly from said outer surface and positioned between said first and second ends of said body portion for removably securing said hydrant nozzle to the fire hydrant; and a pair of spaced apart arcuate shaped locking grooves recessed in said front face of said neck portion for removably securing said hydrant nozzle to the fire hose, said locking grooves defined by a bottom surface recessed from said front face of said neck portion and extending between spaced apart first and second end walls defining said grooves and upstanding, parallel and curved inner and outer walls projecting upwardly from said bottom surface to said front face and extending between said first and second end walls.

2. A hydrant nozzle as set forth in claim 1, wherein each of said locking grooves are further defined by a ramped section adjacent said second end wall and inclining from said bottom surface towards said front face for releasing the fire hose from engagement with said hydrant nozzle.

3. A hydrant nozzle as set forth in claim 2, wherein each of said locking grooves are further defined by including a lip projecting radially inwardly from a portion of said outer wall toward said inner wall and extending from said first end wall to a distal end and forming a top surface of said groove spaced from and parallel to said bottom surface and defining an L-shaped cross-section.

4. A hydrant nozzle as set forth in claim 3, wherein said top surface of said lip includes an inclined section extending from said end toward said first end wall for receiving and guiding the fire hose into engagement with said hydrant nozzle.

5. A hydrant nozzle for connecting a fire hose to a fire hydrant, said hydrant nozzle comprising:

a tubular body portion extending along a longitudinal axis between a first end and a second end, said body portion having a generally cylindrical outer surface and a generally cylindrical inner surface defining a fluid passageway between said first and second ends, said body portion adapted to be received and removably secured to the fire hydrant;

a cylindrical neck portion extending radially from said body portion between said second end to a front face and having an outer peripheral rim and an inner rim defining a center opening in fluid communication with said fluid passageway of said body portion; and a pair of spaced apart arcuate shaped locking grooves recessed in said front face of said neck portion for removably securing said hydrant nozzle to the fire hose, said locking grooves defined by a bottom surface recessed from said front face of said neck portion and extending between spaced apart first and second end walls defining said grooves and upstanding, parallel and curved inner and outer walls projecting upwardly from said bottom surface to said front face and extending between said first and second end walls.

6. A hydrant nozzle as set forth in claim 5, wherein each of said locking grooves are further defined by a ramped section adjacent said second end wall and inclining from said bottom surface towards said front face for releasing the fire hose from engagement with said hydrant nozzle.

7. A hydrant nozzle as set forth in claim 6, wherein each of said locking grooves as further defined by including a lip projecting radially inwardly from a portion of said outer wall toward said inner wall and extending from said first end wall to a distal end and forming a top surface of said groove spaced from and parallel to said bottom surface and defining an L-shaped cross-section.

8. A hydrant nozzle as set forth in claim 7, wherein said top surface of said lip includes an inclined section extending from said end toward said first end wall for receiving and guiding the fire hose into engagement with said hydrant nozzle.

9. A hydrant nozzle as set forth in claim 8, further including a plurality of threads disposed on said outer surface of said body portion between said first and second ends for removably securing said hydrant nozzle to the fire hydrant.

10. A hydrant nozzle as set forth in claim 8, further including a pair of spaced apart locking lugs projecting outwardly from said outer surface of said body portion and positioned between said first and second ends for removably securing said hydrant nozzle to the fire hydrant.

11. A hydrant nozzle as set forth in claim wherein said locking lugs extend along an arcuate path generally transverse to said longitudinal axis of said body portion.

* * * * *

UNITED STATES PATENT AND TRADEMARK OFFICE
CERTIFICATE OF CORRECTION

PATENT NO.    : 6,447,027 B1
DATED         : September 10, 2002
INVENTOR(S)   : Lilley et al.

Figure 4:
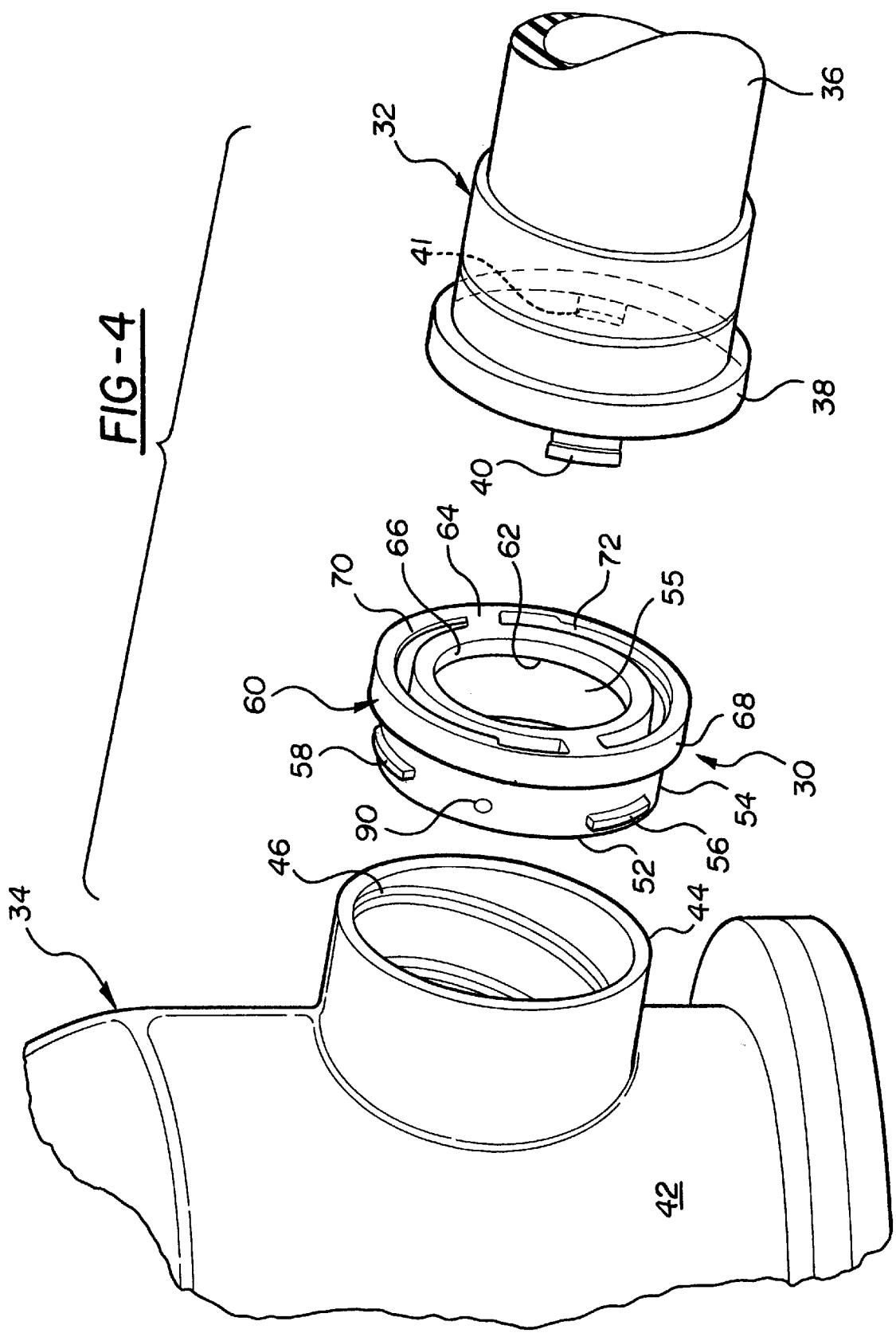
FIG. 4 is partially broken exploded view of the hydrant nozzle connecting a fire hose to the fire hydrant according to the preferred embodiment of the invention.

It is certified that error appears in the above-identified patent and that said Letters Patent is hereby corrected as shown below:

Column 1,
Line 26, delete "mating" and insert -- matingly -- therefor;
Line 28, delete "a" and insert -- an -- therefor;

Column 2,
Line 24, insert -- is -- after "FIG. 1";
Line 34, insert -- a -- after "FIG. 4 is";
Line 62, delete "mating engaging" and insert -- matingly engage -- therefor;
Line 65, delete "completely" and insert -- completing -- therefor;

Column 3,
Line 21, delete "otherwords" and insert -- other words -- therefor;
Line 43, delete "alloy" and insert -- alloy. -- therefor;

Column 4,
Line 27, delete "a" and insert -- an -- therefor;
Line 59, insert -- an -- after "include";

Column 5,
Line 6, delete "assist in releases" and insert -- assists in releasing -- therefor; and Column 6,
Line 60, insert -- 10 -- after "claim".

Signed and Sealed this

Third Day of June, 2003

JAMES E. ROGAN
*Director of the United States Patent and Trademark Office*

(12) EX PARTE REEXAMINATION CERTIFICATE (7096th)
United States Patent
Lilley et al.

(10) Number: US 6,447,027 C1
(45) Certificate Issued: Oct. 6, 2009

(54) QUICK CONNECT HYDRANT NOZZLE FOR CONNECTING A FIRE HOSE TO A FIRE HYDRANT

(75) Inventors: Ted A. Lilley, White Lake, MI (US); Kevin Danielson, Union Lake, MI (US)

(73) Assignee: RLS Group, Inc., White Lake, MI (US)

Reexamination Request:
No. 90/008,129, Jul. 27, 2006

Reexamination Certificate for:
Patent No.: 6,447,027
Issued: Sep. 10, 2002
Appl. No.: 09/659,172
Filed: Sep. 11, 2000

Certificate of Correction issued Jun. 3, 2003.

Related U.S. Application Data
(60) Provisional application No. 60/153,177, filed on Sep. 10, 1999.

(51) Int. Cl.
*F16L 19/00* (2006.01)

(52) U.S. Cl. .................. 285/360; 285/376; 285/401; 285/148.19; 285/148.2

(58) Field of Classification Search ................... None
See application file for complete search history.

(56) References Cited

U.S. PATENT DOCUMENTS

| 489,107 | A | 1/1893 | Storz |
| 4,982,761 | A | 1/1991 | Kreezko |
| 5,301,985 | A | 4/1994 | Terzini |

OTHER PUBLICATIONS

AWG Fire Fighting Equipment for Fire Fighting and Industrial Usage 1983.
Standardizing Hydrants, Penn. Firemen, Jan. 1998.
Harrington's Permanent Hydrant Adaptor Nov. 1998.
NFPA Standards, 1993.
V.A.G. MBH, Jul. 1928.
Century B–50–B18 & B–50–B24 Hydrants, Installation, operation and maintenance manual, Jul. 1997.
Century B–50–B–18 & B–50–B24 Hydrants, Jul. 1997.
Harrington, Inc. The Original Hardware for Large Diameter Hose Systems Aug. 1990.

*Primary Examiner*—Aaron J. Lewis

(57) ABSTRACT

A hydrant nozzle for connecting a fire hose to a fire hydrant. The hydrant nozzle comprises a tubular body portion extending longitudinally between a first end and a second end. The body portion has a generally cylindrical outer surface and a generally cylindrical inner surface defining a fluid passageway between the first and second ends. The nozzle further includes a cylindrical neck portion extending from the second end of the body portion to a front face and having an outer peripheral rim and an inner rim defining a center opening in fluid communication with the fluid passageway of the body portion. A pair of spaced apart locking lugs project outwardly from the outer surface and are positioned between the first and second ends of the body portion for removably securing the hydrant nozzle to the fire hydrant. A pair of spaced apart arcuate shaped locking grooves are recessed in the front face of the neck portion between the inner and outer rims for removably securing the hydrant nozzle to the fire hose.

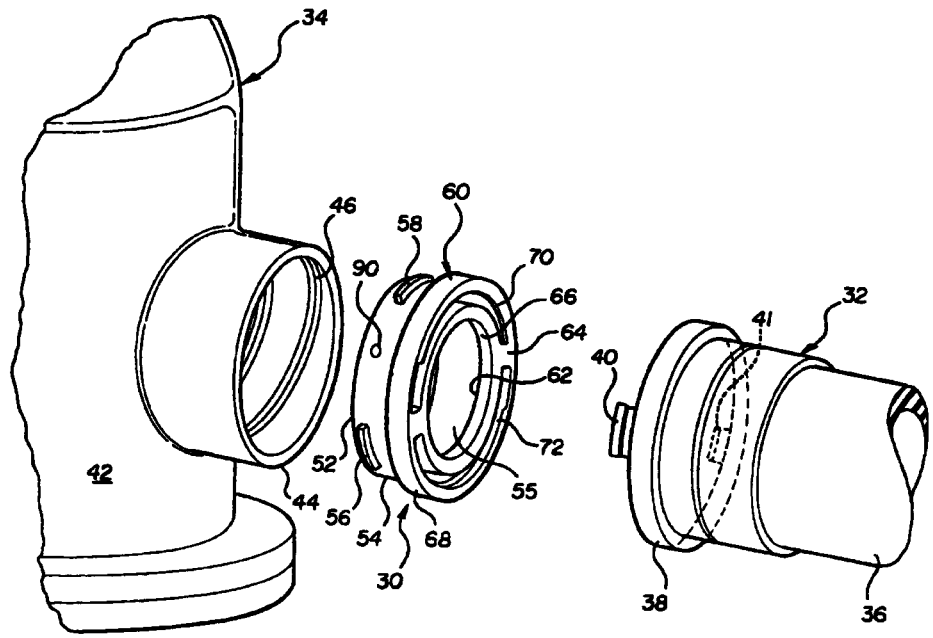

US 6,447,027 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 5, 9 and 10 are determined to be patentable as amended.

Claims 3, 4, 6, 7, 8 and 11, dependent on an amended claim, are determined to be patentable.

New claims 12–20 are added and determined to be patentable.

1. A hydrant nozzle for connecting a fire hose *directly* to a *water outlet of a* fire hydrant, said hydrant nozzle comprising:
   a tubular body portion extending longitudinally between a first end and a second end, said body portion having a generally cylindrical outer surface and a generally cylindrical inner surface defining a fluid passageway between said first and second ends;
   a cylindrical neck portion extending from said second end of the body portion to a front face and having an outer peripheral rim and an inner rim defining a center opening in fluid communication with said fluid passageway of said body portion *and forming a seamless fluid path from said first end of said body portion to said front face of said cylindrical neck portion*;
   a pair of spaced apart locking lugs projecting outwardly from said outer surface and positioned between said first and second ends of said body portion *and sized to be received in the water outlet* for removably securing said hydrant nozzle to the fire hydrant; and
   a pair of spaced apart arcuate shaped locking grooves recessed in said front face of said neck portion for removably securing said hydrant nozzle to the fire hose, said locking grooves defined by a bottom surface recessed from said front face of said neck portion and extending between spaced apart first and second end walls defining grooves and upstanding, parallel and curved inner and outer walls projecting upwardly from said bottom surface to said front face and extending between said first and second end walls.

2. A hydrant nozzle as set forth in claim [1] *19*, wherein each of said locking grooves are further defined by a ramped section adjacent said second end wall and inclining from said bottom surface towards said front face for releasing the fire hose from engagement with said hydrant nozzle.

5. A hydrant nozzle for connecting a fire hose *directly* to a *water outlet of a* fire hydrant, said hydrant nozzle comprising:
   a tubular body portion extending along a longitudinal axis between a first end and a second end, said body portion having a generally cylindrical outer surface and a generally cylindrical inner surface defining a fluid passageway between said first and second ends, said body portion [adapted] *sized* to be received *in the water outlet* and removably secured to the fire hydrant;
   a cylindrical neck portion extending radially from said body portion between said second end to a front face and having an outer peripheral rim and an inner rim defining a center opening in fluid communication with said fluid passageway of said body portion *and forming a seamless fluid path from said first end of said body portion to said front face of said cylindrical neck portion*; and
   a pair of spaced apart arcuate shaped locking grooves recessed in said front face of said neck portion for removably securing said hydrant nozzle to the fire hose, said locking grooves defined by a bottom surface recessed from said front face of said neck portion and extending between spaced apart first and second end walls defining said grooves and upstanding, parallel and curved inner and outer walls projecting upwardly from said bottom surface to said front face and extending between said first and second end walls.

9. A hydrant nozzle as set forth in claim [8] *5*, further including a plurality of threads disposed on said outer surface of said body portion between said first and second ends for removably securing said hydrant nozzle to the fire hydrant.

10. A hydrant nozzle as set forth in claim [8] *5*, further including a pair of spaced apart locking lugs projecting outwardly from said outer surface of said body portion and positioned between said first and second ends for removably securing said hydrant nozzle to the fire hydrant.

*12. In combination, a hydrant nozzle for connecting a fire hose to a fire hydrant comprising:*
   *a fire hydrant having a water outlet for supplying water from said fire hydrant to the fire hose;*
   *a hydrant nozzle for removably connecting the fire hose directly to said water outlet of said fire hydrant and providing fluid communication therebetween, said hydrant nozzle comprising a tubular body portion extending along a longitudinal axis between a first end and a second end, said body portion having a generally cylindrical outer surface and a generally cylindrical inner surface defining a fluid passageway between said first and second ends, said body portion sized to be received in said water outlet and removably secured to said fire hydrant, a cylindrical neck portion extending radially from said body portion between said second end to a front face and having an outer peripheral rim and an inner rim defining a center opening in fluid communication with said fluid passageway of said body portion and forming a seamless fluid path from said first end of said body portion to said front face of said cylindrical neck portion, and a pair of spaced apart arcuate shaped locking grooves recessed in said front face of said neck portion for removably securing said hydrant nozzle to the fire hose, said locking grooves defined by a bottom surface recessed from said front face of said neck portion and extending between spaced apart first and second end walls defining said grooves and upstanding, parallel and curved inner and outer walls projecting upwardly from said bottom surface to said front face and extending between said first and second end walls.*

*13. The combination as set forth in claim 12 wherein each of said locking grooves of said hydrant nozzle are further defined by a lip projecting radially inwardly from a portion of said outer wall toward said inner wall and* extending from said first end wall to a distal end and forming a top surface of said groove spaced from and parallel to said bottom surface and defining an L-shaped cross-section.

14. The combination as set forth in claim 13 wherein said top surface of said lip includes an inclined section extending from said end toward said first end wall for receiving and guiding the first hose into engagement with said hydrant nozzle.

15. The combination as set forth in claim 14 wherein said water outlet of said fire hydrant includes a spiral inner groove and said hydrant nozzle includes a plurality of external threads disposed on said outer surface of said body portion between said first and second ends thereof for mating rotational engagement with said spiral inner groove of said water outlet for removably securing said hydrant nozzle to said fire hydrant.

16. The combination as set forth in claim 14 wherein said water outlet of said fire hydrant includes a spiral inner groove and said hydrant nozzle includes a pair of spaced apart locking lugs projecting outwardly from said outer surface of said body portion and positioned between said first and second ends thereof to be received in said spiral inner groove of said water outlet for removably securing said hydrant nozzle to said fire hydrant.

17. The combination as set forth in claim 16 wherein said locking lugs are positioned generally transverse to said longitudinal axis of said body portion and arranged at a predetermined angle relative to said first and second ends and corresponding to the angle of said spiral inner groove of said water outlet for mating rotational engagement therewith.

18. The combination as set forth in claim 17 wherein each of said locking grooves of said hydrant nozzle are further defined by a ramped section adjacent said second end wall and inclining from said bottom surface toward said front face for releasing the fire hose from engagement with said hydrant nozzle.

19. A hydrant nozzle as set forth in claim 1 wherein said locking lugs extend radially from said body portion along an arcuate path generally transverse to said longitudinal axis of said body portion to be received in the water outlet of the fire hydrant.

20. A hydrant nozzle for connecting a fire hose to a water outlet of a fire hydrant, said hydrant nozzle comprising:

a tubular body portion extending longitudinally between a first end and a second end, said body portion having a generally cylindrical outer surface and a generally cylindrical inner surface defining a fluid passageway between said first and second ends;

a cylindrical neck portion extending from said second end of the body portion to a front face and having an outer peripheral rim and an inner rim defining a center opening in fluid communication with said fluid passageway of said body portion and forming a seamless fluid path from said first end of said body portion to said front face of said cylindrical neck portion;

a pair of spaced apart locking lugs projecting radially outwardly from said outer surface and extending along an arcuate path generally transverse to said longitudinal axis of said body portion, said locking lugs positioned between said first and second ends of said body portion and sized to be received in the water outlet for removably securing said hydrant nozzle to the fire hydrant; and a pair of spaced apart arcuate shaped locking grooves recessed in said front face of said neck portion for removably securing said hydrant nozzle to the fire hose, said locking grooves defined by a bottom surface recessed from said front face of said neck portion and extending between spaced apart first and second end walls defining grooves and upstanding, parallel and curved inner and outer walls projecting upwardly from said bottom surface to said front face and extending between said first and second end walls.

\* \* \* \* \*